US012488500B2

(12) United States Patent
Qin et al.

(10) Patent No.: US 12,488,500 B2
(45) Date of Patent: Dec. 2, 2025

(54) METHODS, SYSTEMS, AND APPARATUSES FOR SIMULTANEOUS EYE CHARACTERISTIC TRACKING AND EYE MODEL UPDATING

(71) Applicant: Apple Inc., Cupertino, CA (US)

(72) Inventors: Hao Qin, Saratoga, CA (US); Chia-Yin Tsai, Sunnyvale, CA (US); Tom Sengelaub, Oakland, CA (US); Hua Gao, San Jose, CA (US); Jie Zhong, Kornwestheim (DE)

(73) Assignee: Apple Inc., Cupertino, CA (US)

( * ) Notice: Subject to any disclaimer, the term of this patent is extended or adjusted under 35 U.S.C. 154(b) by 392 days.

(21) Appl. No.: 18/196,756

(22) Filed: May 12, 2023

(65) Prior Publication Data
US 2023/0377194 A1    Nov. 23, 2023

Related U.S. Application Data

(60) Provisional application No. 63/344,121, filed on May 20, 2022.

(51) Int. Cl.
*G06T 7/73*    (2017.01)

(52) U.S. Cl.
CPC ...... *G06T 7/74* (2017.01); *G06T 2207/10048* (2013.01); *G06T 2207/30201* (2013.01)

(58) Field of Classification Search
CPC ...... G06F 3/013; G06V 10/62; G06V 20/647; G06V 40/193; G06V 40/19; G06V 40/18; G06V 40/197; G06T 7/74; G06T 2207/10048; G06T 2207/30201
See application file for complete search history.

(56) References Cited

U.S. PATENT DOCUMENTS

| | | | |
|---|---|---|---|
| 8,824,779 B1 * | 9/2014 | Smyth | G06T 7/73 382/117 |
| 11,726,560 B2 * | 8/2023 | Sengelaub | H04N 23/90 345/8 |
| 2017/0263006 A1 * | 9/2017 | Hunt | G06F 1/1637 |

(Continued)

FOREIGN PATENT DOCUMENTS

| | | | | |
|---|---|---|---|---|
| CN | 110956071 A | * | 4/2020 | ........... G06V 40/197 |
| WO | WO-2025150060 A1 | * | 7/2025 | |

OTHER PUBLICATIONS

Angelopoulos, Anastasios N., et al. "Event based, near eye gaze tracking beyond 10,000 hz." arXiv preprint arXiv:2004.03577 (2020). (Year: 2020).*

(Continued)

*Primary Examiner* — Michael Robert Cammarata
(74) *Attorney, Agent, or Firm* — Thompson Hine LLP (57) ABSTRACT

Various implementations disclosed herein include an inconspicuous eye enrollment for user devices through the simultaneous or near-simultaneous eye characteristic tracking and eye model updating. The implementations disclosed herein direct light towards an eye of a user to produce glint reflections and obtain, via one or more sensors, image frames comprising depictions of the glint reflections. Based on those image frames, the implementations disclosed herein track eye characteristics and update an eye model of the eye during a period of time between obtaining a first image frame of the image frames and obtaining a second image frame of the image frames.

20 Claims, 5 Drawing Sheets

(56) References Cited

U.S. PATENT DOCUMENTS

| | | | |
|---|---|---|---|
| 2019/0080066 A1* | 3/2019 | Van Os | H04N 23/64 |
| 2019/0101978 A1* | 4/2019 | Iseringhausen | G02B 27/017 |
| 2020/0326777 A1 | 10/2020 | Shoushtari et al. | |
| 2021/0012157 A1* | 1/2021 | Asplund | G01S 7/4008 |
| 2021/0081039 A1* | 3/2021 | Sengelaub | H04N 23/90 |
| 2021/0081040 A1* | 3/2021 | Sengelaub | G02B 27/017 |
| 2021/0106220 A1* | 4/2021 | Abou Shousha | A61B 3/113 |
| 2023/0206474 A1* | 6/2023 | Shin | G06T 7/251 |
| | | | 382/103 |
| 2024/0211039 A1* | 6/2024 | Qin | G06T 7/75 |
| 2024/0272709 A1* | 8/2024 | Qin | G06F 3/013 |
| 2025/0130634 A1* | 4/2025 | Sztuk | G02B 27/0093 |
| 2025/0209661 A1* | 6/2025 | Dos Santos Mendonca | |
| | | | G06T 7/80 |

OTHER PUBLICATIONS

Hansen, Dan Witzner, and Qiang Ji. "In the eye of the beholder: A survey of models for eyes and gaze." IEEE transactions on pattern analysis and machine intelligence 32.3 (2009): 478-500. (Year: 2009).*

Perra, David, Rohit Kumar Gupta, and Jan-Michael Frahm. "Adaptive eye-camera calibration for head-worn devices." Proceedings of the IEEE Conference on Computer Vision and Pattern Recognition. 2015. (Year: 2015).*

Brolly, Xavier, L.C.; Mulligan, Jeffrey B.; "Implicit calibration of a remote gaze tracker"; 2004 Conference on Computer Vision and Pattern Recognition Workshop; pp. 1-8.

Sun, Li; Liu, Zicheng and Sun Ming-Ting; "Real Time Gaze Estimation with a Consumer Depth Camera"; Dec. 19, 2014; pp. 1-38.

Kasprowski, Pawel; Hareziak, Katarzyna; "Using Non-Calibrated Eye Movement Data to Enhance Human Computer Interfaces"; Conference Paper, Jul. 2015; pp. 1-11.

Chen, Jixu; Ji Qiang; "A Probabilistic Approach to Online Eye Gaze Tracking without Personal Calibration"; Journal of Latex Class Files; vol. 6, No. 1; Jan. 2007; pp. 1-14.

Kasprowski, Pawel; Hareziak, Katarzyna; "Implicit Calibration Using Predicted Gaze Targets"; Conference Paper, Mar. 2016; pp. 1-5.

European Patent Office (ISA/EP), International Search Report and Written Opinion of the International Searching Authority, International Application No. PCT/US2023/022028, 14 pages, Sep. 8, 2023.

* cited by examiner

METHODS, SYSTEMS, AND APPARATUSES FOR SIMULTANEOUS EYE CHARACTERISTIC TRACKING AND EYE MODEL UPDATING

CROSS-REFERENCE TO RELATED APPLICATIONS

This application claims the benefit of U.S. Provisional Application Ser. No. 63/344,121 filed May 20, 2022, which is incorporated herein in its entirety.

TECHNICAL FIELD

The present disclosure generally relates to methods, systems, and apparatuses for simultaneous or near-simultaneous tracking of eye characteristic(s) and updating eye model(s).

BACKGROUND

Various techniques are used to track eyes. Separately, various techniques are used to generate three dimensional models of eyes.

SUMMARY

Various implementations disclosed herein include methods, systems, and apparatuses for simultaneously tracking eye characteristics and updating an eye model. For example, by simultaneously tracking eye characteristics and updating an eye model, the methods, systems, and apparatuses described herein set forth an eye model enrollment that does not necessarily require a user to follow multiple/extensive "look here" instructions. Rather, during a normal (e.g., minimally guided) experience, the methods, systems, and apparatuses described herein generate and update a model of a user's eye and simultaneously track an eye characteristic (e.g., gaze direction). In some examples, an illuminator (e.g., of an infrared (IR) pattern) produces glints on the eye and images of the eye with glints are captured by one or more sensors (e.g., cameras). Some (e.g., key frames) or all of the images are used in real time to both (a) determine the eye characteristic (e.g., gaze direction) and (b) update the model.

In some examples, a computing device performs a method by directing light towards an eye of a user using one or more light (e.g., IR) sources to produce glint reflections. The method obtains, via one or more sensors (e.g., at least one image sensor), image frames comprising depictions of reflections of the light via the eye. Based on those image frames, the method tracks an eye characteristic and updates an at least three-dimensional eye model of the eye during a period of time between obtaining a first image frame of the image frames and obtaining a second image frame of the image frames. Therefore, the tracking and updating may occur as new individual frames are captured and selected. In some examples, the frames may be selected by selecting a subset of image frames based on comparing occupation data (e.g., identifying portions of the eye depicted in a given frame) with a coverage map (e.g., identifying portions of the eye already represented in a two-dimensional representation of the eye).

In some examples, a system comprises a non-transitory computer-readable storage medium, one or more processors in communication with the non-transitory computer-readable storage medium, and program instructions configured to be executed by the one or more processors to perform or cause the performance of any of the methods described herein. In some examples, the program instructions are stored within the non-transitory computer-readable storage medium. In some examples, the program instructions, when executed, cause the system to perform or cause performance of any of the methods described herein. In some examples, a system includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Users of head mounted displays (HMD) may be required to engage in an enrollment process or processes in which a user must execute a series of tasks in response to visible or audible cues. Such enrollment processes enable the HMDs to accurately assess certain eye characteristics to enable beneficial extended reality (XR) experiences for users. In some examples, the enrollment processes are inconvenient or burdensome to users who want to jump right into a XR experience, but are prevented from doing so unless the required series of tasks are first performed. The methods, systems, and apparatuses described herein provide an enrollment experience that occurs with minimal user interaction and in the background as the user performs other tasks (e.g., those tasks for which the user wishes to use the HMD).

Figure 1:
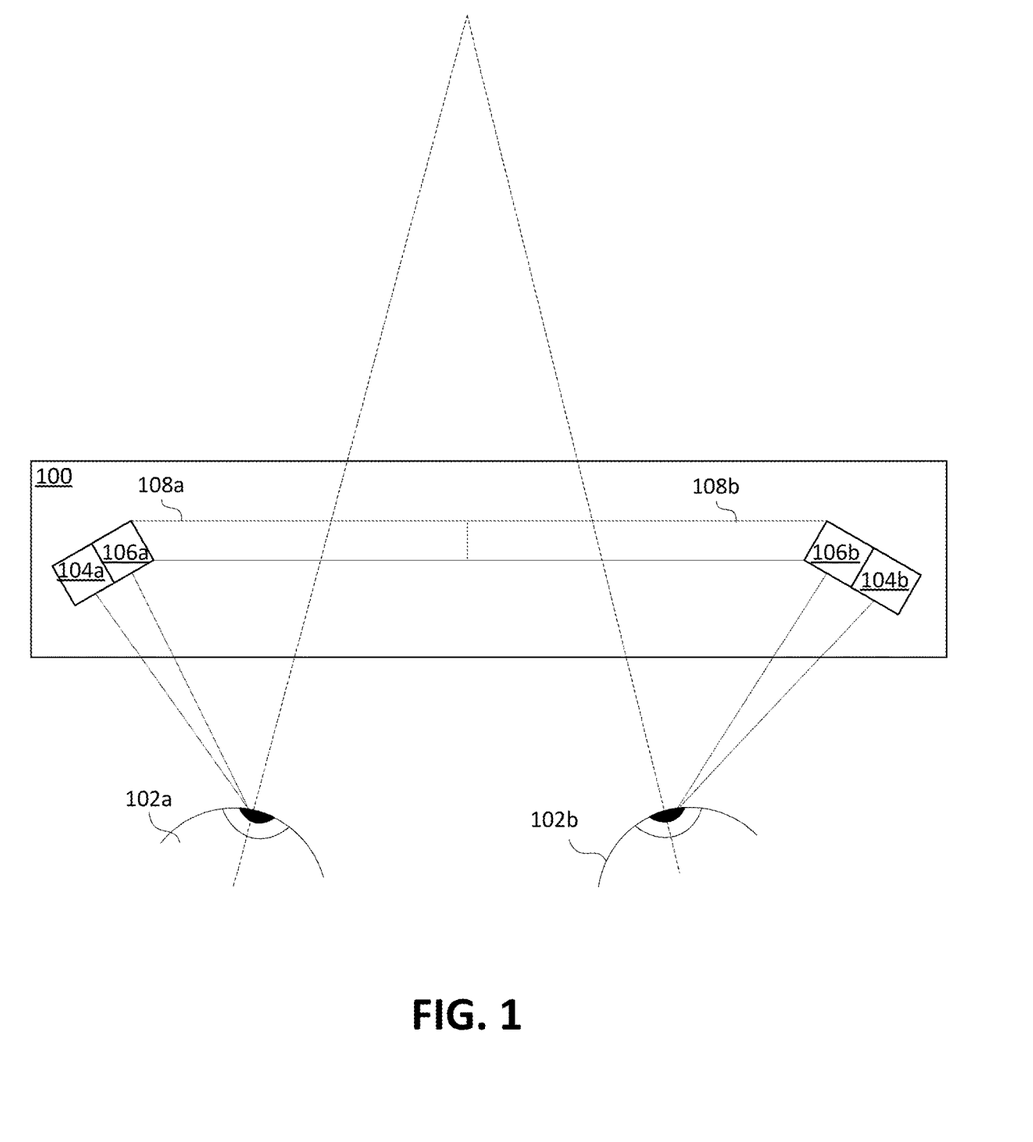
FIG. 1 illustrates an exemplary user device associated with examples disclosed herein.

FIG. 1 illustrates a device 100 for tracking one or more eyes 102a, 102b of a user. While pertinent features are shown, those of ordinary skill in the art will appreciate from the present disclosure that various other features have not been illustrated for the sake of brevity and so as not to obscure more pertinent aspects of the example implementations disclosed herein. The device 100 may be an eye-glasses device, a HMD, a wearable device, a hand-held device, or a device designed for other purposes for which eye tracking is appropriate. In some examples, the device 100 may have one or more sensors 104a, 104b. For example, the device 100 may have one or more cameras (e.g., infrared cameras). In some examples, the device has camera for each eye. In some examples, the device has multiple cameras for each eye. In some examples, the device has only a first camera, but the device also has one or more mirrors arranged to provide reflected images to the first camera that would otherwise be provided by one or more second cameras.

The device 100 may further include one or more illuminators 106a, 106b for directing light towards the one or more eyes 102a that the one or more sensors 104a, 104b may detect. The device 100 may further include one or more content viewing portions 108a, 108b. These components may be embedded within or attached to a housing or other portion of device 100. For example, if device 100 is an eye-glasses device, the one or more sensors 104a, 104b and the one or more illuminators 106a, 106b may be embedded in a frame portion of the eye-glasses device that surrounds or supports the one or more content viewing portions 108a, 108b.

The illuminators 106a, 106b may be configured and positioned to illuminate a respective eye 102a, 102b and/or surrounding areas with light for the purpose of facilitating eye tracking. The illuminators 106a, 106b may emit light towards the one or more eyes 102a, 102b of the user, which reflects in the form of one or more glints off the surface of the eyes 102a, 102b. The one or more illuminators 106a, 106b may be configured to emit light in a near-infrared wavelength range (e.g., a wavelength range within the near-infrared spectrum of approximately 700-1400 nm). However, any wavelength may be used so long as the light produces glints off the surfaces of the eyes 102a, 102b. Each of the one or more illuminators 106a, 106b may comprise a plurality of illuminators that may be operated either synchronously or asynchronously. In some examples, other types of sensors (besides illuminators) may be used such as, for example, depth sensors, ultrasonic sensors, etc.

The one or more sensors 104a, 104b may each include one or more photo sensors, other sensors, and/or processing components that use received light to track an eye characteristic of the eyes 102a, 102b. For example, the illuminator 106a may emit light onto the eye 102a that reflects as a light pattern (e.g., a circle of glints) that can be detected by the sensor 104a. Based on image data (e.g., of the eye 102a and/or a reflected glint pattern) captured by the sensor 104a, the device 100 can determine an eye tracking characteristic. For example, the device 100 may use the image data to determine an eye shape, an eye/pupil position, an eye orientation, and/or a gaze direction of the eye 102a. Thus, in various examples, light may be emitted by the one or more illuminators 106a, 106b, may be reflected off the eyes 102a, 102b, and may be detected by the one or more sensors 104a, 104b and used to determine eye characteristics of the eyes 102a, 102b. In some examples, such data may also be used to generate multi-dimensional (e.g., three-dimensional) models of the eye.

The one or more sensors 104a, 104b may be configured to detect light (e.g., reflections) corresponding to light emitted from the one or more illuminators 106a, 106b. For example, the one or more illuminators 106a, 106b may be configured to produce light in a near-infrared wavelength range and the sensors 104a, 104b may be configured to capture light in the same (or similar) near-infrared wavelength range. In some examples, illuminators are not used and the sensors 104a, 104b may capture images based on reflected ambient light from the eyes 102a, 102b.

The one or more content viewing portions 108a, 108b may display content or make content visible to the user. For example, the one or more content viewing portions 108a, 108b may be transparent lenses through which the user is able to view the surrounding physical environment. In some examples, content is displayed via such otherwise transparent lenses, e.g., using one or more waveguides to form images on the lenses that are visible to the one or more eyes 102a, 102b, respectively. In some examples, the one or more content viewing portions 108a, 108b are opaque (e.g., non-transparent) displays that display images, emitting light towards or onto the one or more eyes 102a, 102b. The device 100 may display content to the one or more eyes 102a, 102b (e.g., a stimulus or one or more stimuli) and track the one or more eyes 102a, 102b while the one or more eyes 102a, 102b are viewing the content through or on the one or more viewing portions 108a, 108b, e.g., tracking the gaze direction, pupil position, and/or occupation (i.e., portion of the eye depicted in a given frame) of the one or more eyes 102a, 102b, determining a portion of the content/physical environment that is being gazed upon based on the gaze direction, and/or estimating a visual axis of the one or more eyes 102a, 102b.

Figure 2:
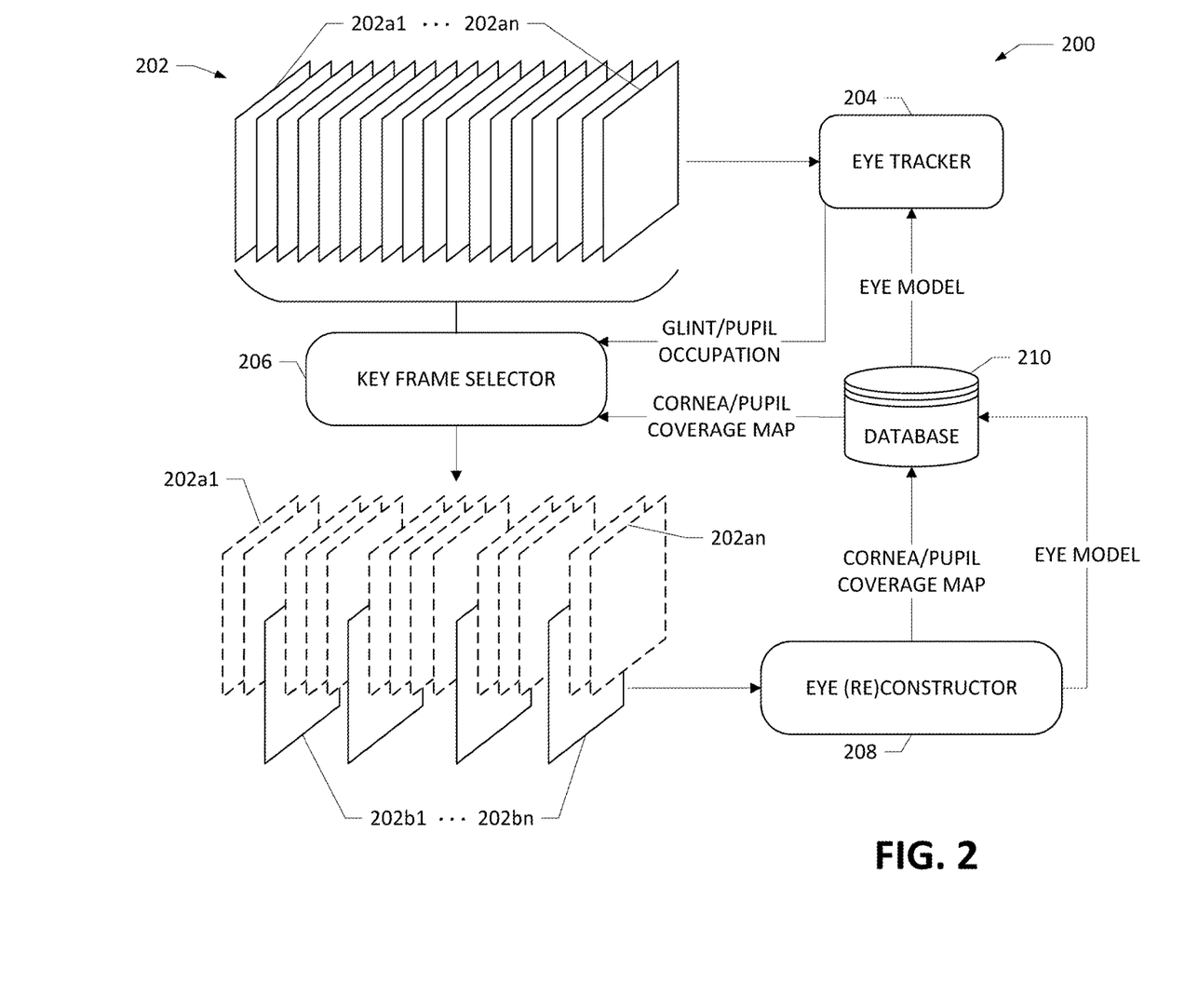
FIG. 2 illustrates an example block diagram associated with examples disclosed herein.

FIG. 2 illustrates a block diagram of an eye modeler 200 that is configured to track and update an eye model of a user (e.g., one or more of the one or more eyes 102a, 102b of FIG. 1) at or nearly at a same time. The eye modeler 200 may be part of the device 100 described with reference to FIG. 1. The eye modeler 200 may take a sequence of eye images or frames 202, which may be acquired by the one or more sensors 104a, 104b of FIG. 1, and input the sequence of eye images or frames 202 into an eye tracker 204 and a key frame selector 206. As illustrated in FIG. 2, the sequence of eye images or frames 202 may comprise a number (n) of images or frames $202a_1$-$202a_n$. In some examples, the number (n) of images or frames $202a_1$-$202a_n$ may correspond with images or frames obtained in a serial fashion. In some examples, the number (n) of images or frames $202a_1$-$202a_n$ may not be serial.

The eye tracker 204 may use the number (n) of images or frames $202a_1$-$202a_n$ to track eye characteristics such as instant gaze direction. The eye tracker 204 may track eye glint/pupil occupation, for example, by determining one or more portions of the eye that are depicted in a given frame based on the frame content and/or glints depicted in the frame content. In some examples, each image or frame of the number (n) of images or frames $202a_1$-$202a_n$ (e.g., all images or frames) may be used to track eye characteristics in real or near-real time. In some examples, subsets of the number (n) of images or frames $202a_1$-$202a_n$ may be used to track eye characteristics at different intervals. In some examples, the eye tracker 204 may send data corresponding to the current glint/pupil occupation (e.g., the portion of the eye depicted in a given frame) to the key frame selector 206.

The key frame selector 206 may, based on the number (n) of images or frames $202a_1$-$202a_n$ and based on the eye glint/pupil occupation received from the eye tracker 204, select a subset of images or frames as key frames $202b_1$-$202b_n$. In some examples, the key frame selector 206 may analyze the eye glint/pupil occupation associated with a particular image or frame of the number (n) of images or frames $202a_1$-$202a_n$, and compare that eye glint/pupil occupation with a threshold. In some examples, the threshold may be an indication that a current eye glint/pupil occupation from an image or frame differs significantly from a previous eye glint/pupil occupation. In some examples, the threshold may be associated with a cornea/pupil coverage map generated by an eye (re)constructor 208, as further discussed below. If the eye glint/pupil occupation associated with a particular image or frame of the number (n) of images or frames $202a_1$-$202a_n$ satisfies the threshold, then the key frame selector 206 may select that particular image or frame as a key frame.

Each selected key frame $202b_1$-$202b_n$ may be input into the eye (re)constructor 208. The eye (re)constructor 208 may, based on the selected key frames $202b_1$-$202b_n$, generate an eye model and a cornea/pupil coverage map. In some examples, the eye (re)constructor 208 may, based on the selected key frames $202b_1$-$202b_n$, update the eye model and the cornea/pupil coverage map. In some examples, the eye model and/or the cornea/pupil coverage map may be updated each time a new key frame is selected by the key frame selector 206. In some examples, the eye model and/or the cornea/pupil coverage map may be updated during a period of time between obtaining a first image or frame (e.g., of the number (n) of images or frames $202a_1$-$202a_n$) and obtaining a second image or frame. The eye (re)constructor 208 may generate each new eye model based on new and old key frames. Accordingly, as time passes the eye (re)constructor 208 may update and refine the model(s) of the user's eye(s). Thus, in some examples, the eye modeler 200 may be running continuously and the data represented in FIG. 2 may be processed in a one or more software loops. In some examples, the eye modeler 200 may involve unsupervised machine learning algorithms.

In some examples, the eye (re)constructor 208 may update the eye model and/or the cornea/pupil coverage map simultaneously (or near simultaneously) with the tracking of the eye characteristics by the eye tracker 204. In some examples, the eye (re)constructor 208 may update the eye model and/or the cornea/pupil coverage map and the eye tracker 204 may track the eye characteristics between images or frames of the number (n) of images or frames $202a_1$-$202a_n$. In some examples, the eye (re)constructor 208 and the eye tracker 204 use some of the same images or frames such that the eye (re)constructor 208 and the eye tracker 204 share at least some common data.

The eye model may be a multi-dimensional model of the eye. For example, the eye model may be a model, in three-dimensional space, that represents the user's eye. The eye model may be a point cloud, a triangular mesh, or any other type of multi-dimensional model. In some examples, the eye model may be a four-dimensional model, in terms of both space and time (e.g., a three-dimensional model of the eye that moves over time). In some examples, the eye model may include a number of dimensions corresponding to various eye characteristics rather than space and time. The cornea/pupil coverage map may be a binary two-dimensional array or grid (e.g., 5×5, 15×15, 25×25) representation of the cornea/pupil. If a glint is identified within a cell of the grid, that cell is populated as having coverage at that location (e.g., binary yes).

In some examples, each iteration of the cornea/pupil coverage map and the eye model are stored in a database 210 before being sent to the key frame selector 206 and the eye tracker 204, respectively. In some examples, each iteration of the cornea/pupil coverage map overwrites the previous iteration of the cornea/pupil coverage map stored in the database 210 and each iteration of the eye model overwrites the previous iteration of the eye model stored in the database 210. In some examples, database 210 stores multiple iterations of each of the cornea/pupil coverage map and the eye model.

Database 210 may be a database local to the eye modeler 200 and/or the device 100 such that the data used to generate eye models of user's eyes and other user information (e.g., the cornea/pupil coverage map) is only used to help improve a user experience (e.g., seamless user eye enrollment). In the processes described herein, eye models and other aspects of user privacy should be respected, as examples, by ensuring the user understands and consents to the use of user data, understands what types of user data are used, has control over the collection and use of user data and limiting distribution of user data, for example, by ensuring that user data is processed locally on the user's device. Users should have the option to opt in or out with respect to whether their user data is obtained or used or to otherwise turn on and off any features that obtain or use user information. Moreover, each user will have the ability to access and otherwise find out anything that the system has collected or determined about him or her. Such user data described herein may be stored securely on the user's device in the database 210, e.g., as a secure enclave, for securing certain user information, e.g., data from image and other sensors that is used for eye or other biometric identification. The user data associated with the user's eye(s) and/or attention state may be stored in such a secure enclave, restricting access to the user data and restricting transmission of the user data to other devices to ensure that the user data is kept securely on the user's device. User data may be prohibited from leaving the user's device and may be used only the described systems and apparatuses described herein and corresponding methods performed locally on the user's device.

Figure 3:
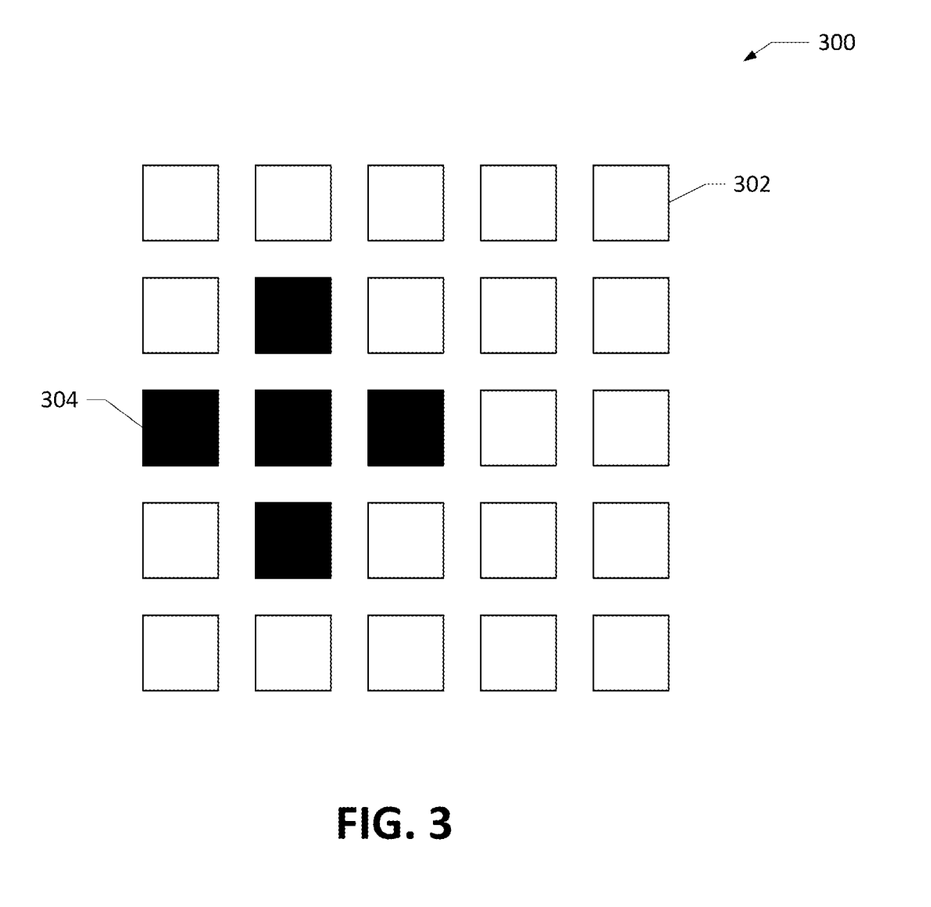
FIG. 3 illustrates an exemplary coverage map associated with examples disclosed herein.

FIG. 3 is an illustration of an example cornea/pupil coverage map 300. As described above, the cornea/pupil coverage map 300 may be a binary two-dimensional grid representative of a user's cornea/pupil. The cornea/pupil coverage map 300 may comprise a plurality of cells 302 (e.g., 5×5) that may either be empty (e.g., binary 0) or shaded (e.g., binary 1) to illustrate whether there is coverage in that respective cell 302 of the cornea/pupil coverage map 300. Based on determining that one of the previously-used key frames included content depicting a given portion of the eye, the associated cell within the cornea/pupil coverage map 300 is populated to indicate that that portion of the eye has been covered already. Accordingly, generating and/or updating the cornea/pupil coverage map 300 may involve populating one or more cells of a two-dimensional grid representative the user's cornea/pupil. In some examples, the eye (re)constructor 208 assigns a binary value (e.g., 1) to the corresponding cells. In some examples, the eye (re) constructor 208 visually alters the corresponding cells (e.g., by shading the cell in a way that indicates cell coverage). As illustrated in FIG. 3, the cells 304 are visually altered (e.g., shaded) to illustrate a location of a glint detected by the one or more sensors 104a, 104b. Alternatively, the same data may be represented with binary ones and zeros as shown below in Table 1:

TABLE 1

| 0 | 0 | 0 | 0 | 0 |
| 0 | 1 | 0 | 0 | 0 |
| 1 | 1 | 1 | 0 | 0 |
| 0 | 1 | 0 | 0 | 0 |
| 0 | 0 | 0 | 0 | 0 |

While FIG. 3 illustrates coverage in black shading of cells 304 with the remaining cells 302 colored white, other visual representations are possible (inverting the color scheme of FIG. 3, a heat map, etc.). In some implementations, cell values quantify a level, quality, or amount of coverage, e.g., 0 indicating no coverage, 1 limited or low-quality coverage, and 2 indicating high quality coverage. Differences in coverage quality may be assessed using one or more criteria, such as the position (e.g., image center or image perimeter) of the corresponding portion of the eye in the key frame the provides the coverage or angle of the portion of the eye relative to the image capture direction (e.g., orthogonal, offset at 45 degree angle, etc.). In another example, differences in coverage quality for different portions of the eye may be assessed using statistical techniques, e.g., based on confidence values associated with portions of image data corresponding to the individual portions of the eye.

As described herein, the cornea/pupil coverage map 300 may be updated by altering the binary value or changing the visual representation of the cells. In some examples, the cornea/pupil coverage map 300 is updated based on detecting that a new image/frame provides information that is different or inconsistent with information generated from one or more prior key frames by a threshold amount.

In some implementations, a coverage map is updated over time as additional key frames are selected and used to generate a multi-dimensional model of an eye. Each additional key frame that is identified may be used to update the model and, over time, the model may improve with respect to how well it "covers" (i.e., represents the entirety of) the eye. A coverage map provides one way of representing or quantifying how well individual portions of the eye are currently represented in the model. Accordingly, as the model is updated and its coverage improves as more and more key frames are selected and used, so too may the associated coverage map be updated to reflect the improved coverage of the 3D model. The coverage map may thus provide a representation/quantification of how well individual portions of the eye are currently represented in a 3D model that can be used to select amongst key frames from new candidate key frames. New frames that depict portions of the eye that are not covered (or covered poorly) as shown by the coverage map may be better suited for use as key frames, since those frames provide more "new" or otherwise more beneficial information in terms of improving the model.

In some implementations, the updating of the multi-dimensional model of an eye concludes when one or more criteria or satisfied. For example, once a coverage map is substantially completed (e.g., coverage at least completed above a given threshold such as 97%, 98%, 99%, 100%, etc.) or completed with coverage values that signify that the existing key frames depict substantially all portions of the eye with at least a threshold level of quality (e.g., coverage values of at least X in coverage map that uses quality values).

Figure 4:
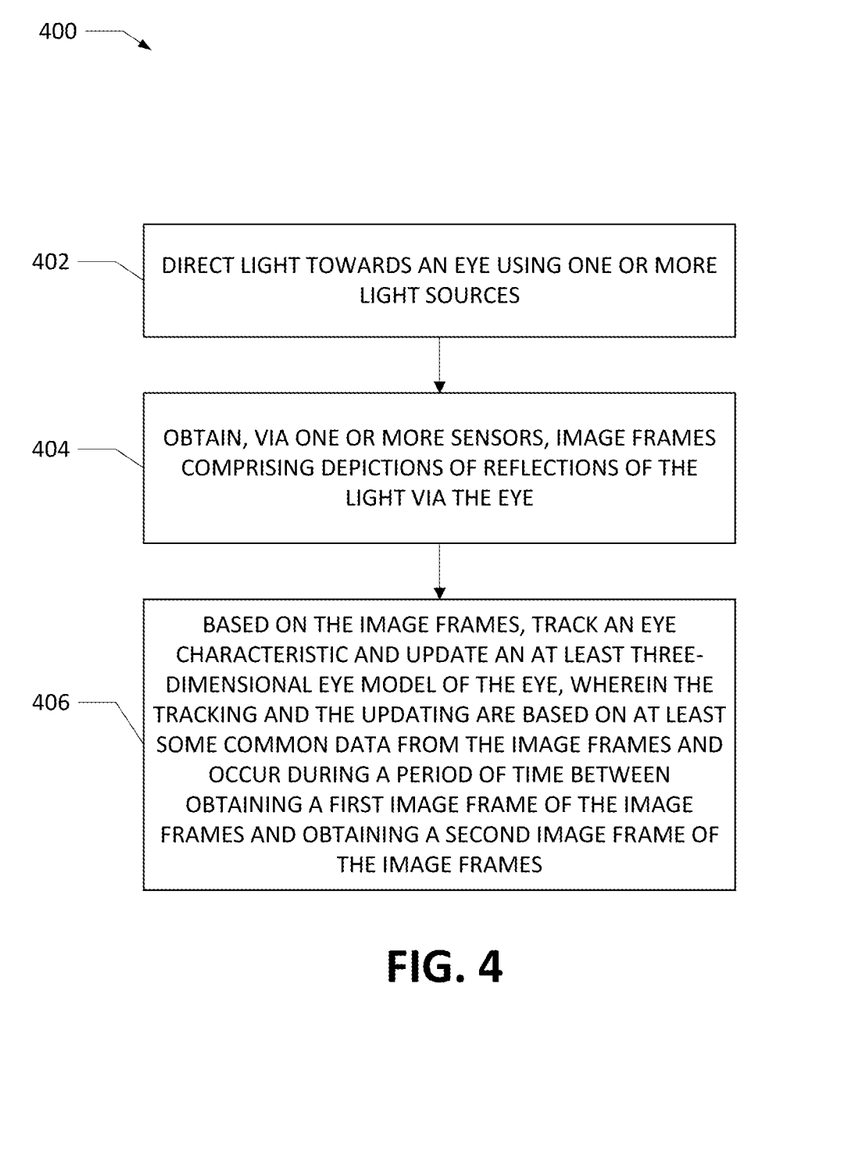
FIG. 4 illustrates a flowchart representing a method of tracking eye characteristics and updating an eye model associated with examples disclosed herein.

FIG. 4 is a flowchart illustrating an exemplary method 400. In some examples, a head mounted device such as device 100 (FIG. 1) and/or eye modeler 200 (FIG. 2) performs the techniques of method 400 to track eye characteristics and generate an eye model for the user. In some examples, the method 400 is performed on processing logic, including hardware, firmware, software, or a combination thereof. In some implementations, the method 400 is performed on a processor executing code stored in a non-transitory computer-readable medium (e.g., a memory).

At block 402, one or more illuminators (e.g., the one or more illuminators 106a, 106b of FIG. 1) directs light towards an eye of a user. The light may correspond to a particular wavelength of light, e.g., near IR light. At block 404, one or more sensors (e.g., the one or more sensors 104a, 104b of FIG. 1) may obtain images or frames comprising depictions of reflections of the light via the eye. The images or frames of the eye may each comprise a matrix of pixel values representing light detected by pixel of an image sensor of the camera. The images may correspond to light reflected off the surface of an eye. The images may correspond to light generated by an illuminator that is reflected off the surface of the eye. The images may correspond to a particular wavelength of light, e.g., near IR light.

At block 406, an eye modeler (e.g., the eye modeler 200) may, based on the images or frames, track an eye characteristic (e.g., via eye tracker 204) and update an at least three-dimensional model of the eye (e.g., via eye (re) constructor 208). The eye characteristic tracking may involve determining gaze directions of an eye at capture times based on the images or frames of the eye and/or may involve determining pupil positions of the first eye at the capture times based on the images of the first eye. Pupil positions may be determined in a 3D coordinate system or relative to the second eye. In some examples, the eye characteristic tracking may be based on the current iteration of the eye model. As discussed with reference to FIGS. 2 and 3, the eye (re)constructor 208 may create a cornea/pupil coverage map 300 based on the pixels of the images or frames of the eye that contain glints. Similarly, the eye (re)constructor 208 may utilize various data received via the images or frames of the eye to create and update the at least three-dimensional model of the eye. In some examples, the tracking and the updating are based on at least some common data from the images or frames. In some examples, the tracking and the updating occur during a period of time between obtaining a first image or frame and obtaining a second image or frame (e.g., of the number (n) of images or frames $202a_1$-$202a_n$). In some examples, the eye characteristic tracking and the eye model updating occur with minimum user input, such that the tracking and updating occur in the background and are inconspicuous to the user. In this way, the user can benefit from eye enrollment without executing a dedicating process prior to using the device.

Figure 5:
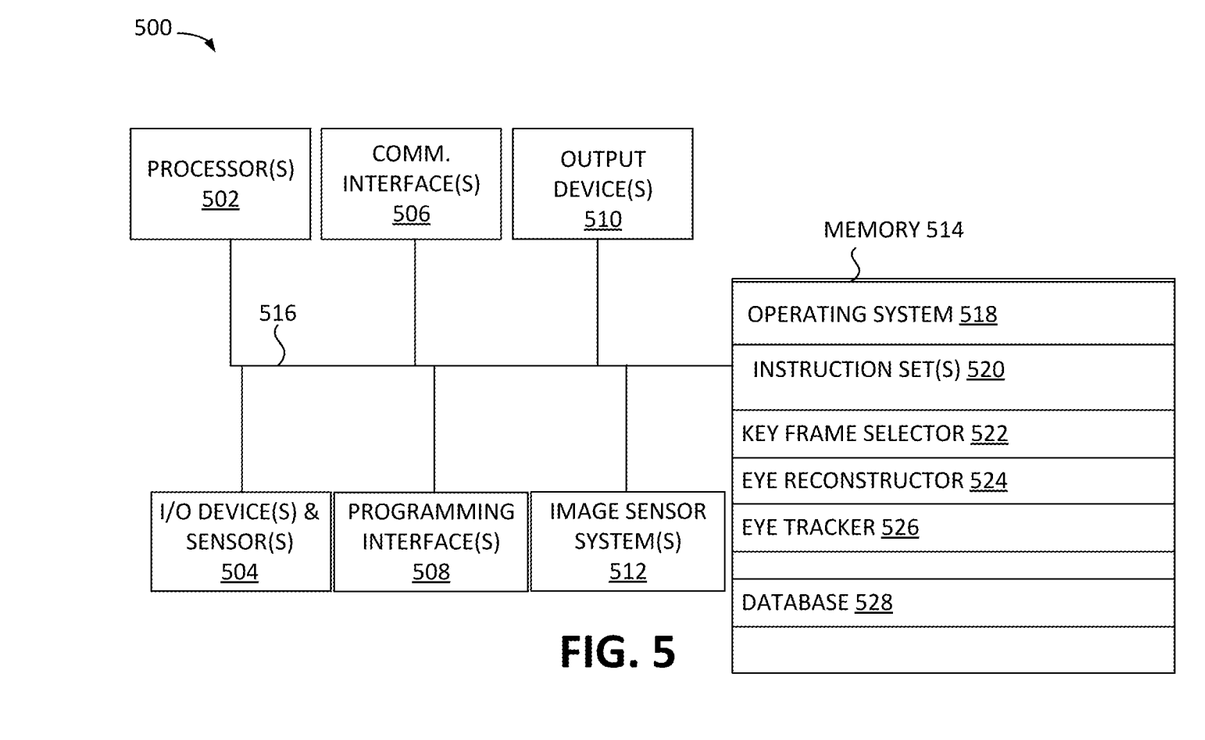
FIG. 5 illustrates a block diagram of an electronic device in accordance with some examples disclosed herein.

FIG. 5 is a block diagram of electronic device 500. Device 500 illustrates an exemplary device configuration for device 100 and/or eye modeler 200 to track an eye characteristic and update an at least three-dimensional model of the eye. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processors 502 (e.g., microprocessors, ASICs, FPGAs, GPUs, CPUs, processing cores, and/or the like), one or more input/output (I/O) devices and sensors 504, one or more communication interfaces 506 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 508, one or more output device(s) 510, one or more interior and/or exterior facing image sensor systems 512, a memory 514, and one or more communication buses 416 for interconnecting these and various other components.

In some implementations, the one or more communication buses 516 include circuitry that interconnects and controls communications between system components. In some implementations, the one or more I/O devices and sensors 504 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 510 include one or more displays configured to present a view of a 3D environment to the user. In some implementations, the one or more output device(s) 510 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more output device(s) 510 correspond to diffractive, reflective, polarized, holographic, etc. waveguide displays. In one example, the device 500 includes a single display. In another example, the device 500 includes a display for each eye of the user.

In some implementations, the one or more output device(s) 510 include one or more audio producing devices. In some implementations, the one or more output device(s) 510 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 510 may additionally or alternatively be configured to generate haptics.

In some implementations, the one or more image sensor systems 512 are configured to obtain image data that corresponds to at least a portion of a physical environment. For example, the one or more image sensor systems 512 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 512 further include illumination sources that emit light, such as a flash. In various implementations, the one or more image sensor systems 512 further include an on-camera image signal processor (ISP) configured to execute a plurality of processing operations on the image data.

The memory 514 includes high-speed random-access memory, such as DRAM, SRAM, DDR RAM, or other random-access solid-state memory devices. In some implementations, the memory 514 includes non-volatile memory, such as one or more magnetic disk storage devices, optical disk storage devices, flash memory devices, or other non-volatile solid-state storage devices. The memory 514 optionally includes one or more storage devices remotely located from the one or more processors 502. The memory 514 comprises a non-transitory computer readable storage medium.

In some implementations, the memory 514 or the non-transitory computer readable storage medium of the memory 514 stores an optional operating system 518 and one or more instruction set(s) 520. The operating system 518 includes procedures for handling various basic system services and for performing hardware dependent tasks. In some implementations, the instruction set(s) 520 include executable software defined by binary information stored in the form of electrical charge. In some implementations, the instruction set(s) 520 are software that is executable by the one or more processors 502 to carry out one or more of the techniques described herein. The instruction set(s) 520 includes a key frame selector 522 configured to, upon execution, select from a plurality of images or frames a subset of images or frames that comprise eye glints or pupil occupations that satisfy a threshold, as described herein. The instruction set(s) 520 includes an eye (re)constructor 524 configured to, upon execution, generate and/or update an eye model and a cornea/pupil coverage map, as described herein. The instruction set(s) 520 includes an eye tracker 526 configured to, upon execution, track eye characteristics in or at near real-time, as described herein. Memory 514 may further comprise database 528 configured to store the eye models and/or the cornea/pupil coverage maps securely as described herein.

Although the instruction set(s) 520 are shown as residing on a single device, it should be understood that in other implementations, any combination of the elements may be located in separate computing devices. Moreover, FIG. 5 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is a method that involves directing light towards an eye of a user using one or more light sources. In some examples, the method involves obtaining, via one or more sensors, image frames comprising depictions of reflections of the light via the eye. In some examples, the method involves tracking an eye characteristic and updating an at least three-dimensional eye model of the eye, wherein the tracking and the updating are based on at least some common data from the image frames and occur during a period of time between obtaining a first image frame of the image frames and obtaining a second image frame of the image frames.

Another aspect of the present technology is a system including non-transitory computer-readable storage medium and one or more processors in communication with the non-transitory computer-readable storage medium and storing program instructions that when executed on the one or more processors, cause the system to direct light towards an eye of a user using one or more light sources. In some examples, the system involves obtaining, via one or more sensors, image frames comprising depictions of reflections of the light via the eye. In some examples, the system involves tracking an eye characteristic and updating an at least three-dimensional eye model of the eye, wherein the tracking and the updating are based on at least some common data from the image frames and occur during a period of time between obtaining a first image frame of the image frames and obtaining a second image frame of the image frames.

Another aspect of the present technology is a non-transitory computer-readable storage medium storing program instructions executable via one or more processors to perform operations to direct light towards an eye of a user using one or more light sources. In some examples, the non-transitory computer-readable storage medium involves obtaining, via one or more sensors, image frames comprising depictions of reflections of the light via the eye. In some examples, the non-transitory computer-readable storage medium involves tracking an eye characteristic and updating an at least three-dimensional eye model of the eye, wherein the tracking and the updating are based on at least some common data from the image frames and occur during a period of time between obtaining a first image frame of the image frames and obtaining a second image frame of the image frames.

In some examples, the method, system, and/or non-transitory computer-readable storage medium involve causing display of a stimulus to attract the eye of the user towards the stimulus.

In some examples, the method, system, and/or non-transitory computer-readable storage medium involve estimating a visual axis of the eye based on the display of the stimulus.

In some examples, the method, system, and/or non-transitory computer-readable storage medium involve determining, based on the at least three-dimensional eye model, an eye coverage map.

In some examples, the method, system, and/or non-transitory computer-readable storage medium involve comparing the eye coverage map with the respective eye glints or the respective pupil occupations, and determining a second subset of image frames associated with an eye glint or a pupil occupation that satisfies a threshold associated with the eye coverage map.

In some examples, there are one or more other image frames between the first image frame the second image frame.

In some examples, the common data comprises a first subset of the image frames having data that satisfies a threshold amount of eye data.

In some examples, the image frames comprise a sequence of image frames.

In some examples, the tracking the eye characteristic comprising tracking respective eye glints or respective pupil occupations from the image frames.

In some examples, the tracking the eye characteristic and the updating the at least three-dimensional eye model occur with minimum user input.

In some examples, the obtaining the image frames comprises obtaining images from multiple infrared cameras.

In some examples, the obtaining the image frames comprises obtaining images from an infrared camera and images reflected off of a mirror.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    directing light towards an eye using one or more light sources;
    obtaining, via one or more sensors, image frames comprising depictions of reflections of the light via the eye; and
    based on the image frames, tracking an eye characteristic and updating an at least three-dimensional (3D) eye model of the eye, wherein the tracking and the updating occur during a period of time between obtaining a first image frame of the image frames and obtaining a second image frame of the image frames, and wherein the at least 3D eye model is updated based on a subset of less than all of the image frames, the subset selected based on comparing portions of the eye represented in the subset and portions of the eye already represented in the at least 3D eye model.

2. The method of claim 1, wherein there is one image frame between the first image frame the second image frame.

3. The method of claim 1, wherein the tracking the eye characteristic and the updating the at least 3D eye model of the eye are both based on a first subset of the image frames each having data that satisfies a threshold amount of eye data.

4. The method of claim 1, wherein the image frames comprise a sequence of image frames.

5. The method of claim 1, further comprising causing display of a stimulus to attract the eye towards the stimulus.

6. The method of claim 5, further comprising estimating a visual axis of the eye based on the display of the stimulus.

7. The method of claim 1, wherein the tracking the eye characteristic comprising tracking respective eye glints or respective pupil occupations from the image frames.

8. The method of claim 7, further comprising determining, based on the at least three-dimensional eye model, an eye coverage map.

9. The method of claim 8, further comprising:
    comparing the eye coverage map with the respective eye glints or the respective pupil occupations; and
    determining a second subset of image frames associated with an eye glint or a pupil occupation that satisfies a threshold associated with the eye coverage map.

10. The method of claim 1, wherein the tracking the eye characteristic and the updating the at least three-dimensional eye model occur with minimum user input.

11. The method of claim 1, wherein the obtaining the image frames comprises obtaining images from multiple infrared cameras.

12. The method of claim 1, wherein the obtaining the image frames comprises obtaining images from an infrared camera and images reflected off of a mirror.

13. A system comprising:
    a non-transitory computer-readable storage medium; and
    one or more processors in communication with the non-transitory computer-readable storage medium, wherein the non-transitory computer-readable storage medium comprises program instructions that, when executed on the one or more processors, cause the system to perform operations comprising:
    directing light towards an eye using one or more light sources;
    obtaining, via one or more sensors, image frames comprising depictions of reflections of the light via the eye; and
    based on the image frames, tracking an eye characteristic and updating an at least three-dimensional (3D) eye model of the eye, wherein the tracking and the updating occur during a period of time between obtaining a first image frame of the image frames and obtaining a second image frame of the image frames, and wherein the at least 3D eye model is updated based on a subset of less than all of the image frames, the subset selected based on comparing portions of the eye represented in the subset and portions of the eye already represented in the at least 3D eye model.

14. The system of claim 13, wherein there is one image frame between the first image frame the second image frame.

15. The system of claim 13, wherein the tracking the eye characteristic and the updating the at least 3D eye model of the eye are both based on a first subset of the image frames each having data that satisfies a threshold amount of eye data.

16. The system of claim 13, wherein the image frames comprise a sequence of image frames.

17. The system of claim 13, wherein the instructions, when executed on the one or more processors, cause the system to perform operations comprising:
    causing display of a stimulus to attract the eye towards the stimulus.

18. The system of claim 17, wherein the instructions, when executed on the one or more processors, cause the system to perform operations comprising:
- estimating a visual axis of the eye based on the display of the stimulus.

19. The system of claim 13, wherein tracking the eye characteristic comprising tracking respective eye glints or respective pupil occupations from the image frames.

20. A non-transitory computer-readable storage medium storing program instructions executable via one or more processors to perform operations comprising:
- directing light towards an eye using one or more light sources;
- obtaining, via one or more sensors, image frames comprising depictions of reflections of the light via the eye; and
- based on the image frames, tracking an eye characteristic and updating an at least three-dimensional (3D) eye model of the eye, wherein the tracking and the updating occur during a period of time between obtaining a first image frame of the image frames and obtaining a second image frame of the image frames, and wherein the at least 3D eye model is updated based on a subset of less than all of the image frames, the subset selected based on comparing portions of the eye represented in the subset and portions of the eye already represented in the at least 3D eye model.

* * * * *

UNITED STATES PATENT AND TRADEMARK OFFICE
CERTIFICATE OF CORRECTION

| | | |
|---|---|---|
| PATENT NO. | : 12,488,500 B2 | Page 1 of 1 |
| APPLICATION NO. | : 18/196756 | |
| DATED | : December 2, 2025 | |
| INVENTOR(S) | : Hao Qin et al. | |

It is certified that error appears in the above-identified patent and that said Letters Patent is hereby corrected as shown below:

In the Claims

Claim 2, Column 13, Lines 59 read:
"...frame between the first image frame the second image..."

Should read:
--...frame between the first image frame and the second image...--

Claim 14, Column 14, Lines 54 read:
"...frame between the first image frame the second image..."

Should read:
--...frame between the first image frame and the second image...--

Signed and Sealed this
Thirtieth Day of December, 2025

John A. Squires
*Director of the United States Patent and Trademark Office*